United States Patent
Chen et al.

(10) Patent No.: US 9,823,650 B2
(45) Date of Patent: Nov. 21, 2017

(54) METHOD AND SYSTEM FOR INTERACTING MASTER AND SLAVE INFORMATION IN REAL TIME

(71) Applicant: GRG Banking Equipment Co., Ltd., Guangzhou, Guangdong (CN)

(72) Inventors: Weibin Chen, Guangdong (CN); Ping Gao, Guangdong (CN); Canjie Wang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/104,344

(22) PCT Filed: Oct. 9, 2014

(86) PCT No.: PCT/CN2014/088181
§ 371 (c)(1),
(2) Date: Jun. 14, 2016

(87) PCT Pub. No.: WO2015/109871
PCT Pub. Date: Jul. 30, 2015

(65) Prior Publication Data
US 2016/0313727 A1    Oct. 27, 2016

(30) Foreign Application Priority Data
Jan. 26, 2014    (CN) .......................... 2014 1 0039040

(51) Int. Cl.
*G05B 19/418*    (2006.01)
*H04L 29/08*    (2006.01)

(52) U.S. Cl.
CPC .......... *G05B 19/4185* (2013.01); *H04L 67/12* (2013.01); *G05B 2219/1208* (2013.01);
(Continued)

(58) Field of Classification Search
CPC ...... G06B 19/4185; H04L 67/12; Y02P 90/18
See application file for complete search history.

(56) References Cited

U.S. PATENT DOCUMENTS

| 6,867,682 B2 | 3/2005 | Reinhardt et al. |
| 2005/0044214 A1* | 2/2005 | Schwertfuehrer ...... H04L 29/06 709/224 |

(Continued)

FOREIGN PATENT DOCUMENTS

| CN | 101220605 A | 7/2008 |
| CN | 101304179 A | 11/2008 |

(Continued)

OTHER PUBLICATIONS

Design and Implement of Intelligent Synchronous Data Sampling Card of Master-Slave Mode, 武汉工学院学报, , Sep. 1994, Qian Shuhai, Shi Liying, Guo Yanli, Lu Luoxian.
(Continued)

*Primary Examiner* — Arvin Eskandarnia
(74) *Attorney, Agent, or Firm* — U.S. Fairsky LLP; Yue Xu (57) ABSTRACT

A method for interacting master and slave information in real time, comprising: collecting, by N slave control MCUs, sensor signals of sensors respectively connected thereto; feeding back, by the N slave control MCUs, the sensor signals to a master control MCU via a signal transfer panel; and when the sensor signals satisfy a pre-set condition, giving, by the master control MCU, a control instruction to a corresponding slave control MCU according to the pre-set condition, wherein both the sensor signals and the control instruction are transmitted between the master control MCU and the slave control MCUs via the signal transfer panel in an SP signal manner. Also disclosed is a system for interacting master and slave information in real time. The method
(Continued)

for interacting master and slave information in real time can reduce the redundant information interaction and improve the communication efficiency.

17 Claims, 7 Drawing Sheets

(52) U.S. Cl.
CPC .............. *G05B 2219/1215* (2013.01); *G05B 2219/25032* (2013.01); *G05B 2219/25257* (2013.01); *Y02P 90/18* (2015.11)

(56) References Cited

U.S. PATENT DOCUMENTS

| | | | |
|---|---|---|---|
| 2008/0061924 A1 | 3/2008 | Labowicz | |
| 2014/0022593 A1* | 1/2014 | Seki | G06F 3/1296 358/1.15 |
| 2014/0189167 A1* | 7/2014 | Joergensen | G06F 1/206 710/16 |

FOREIGN PATENT DOCUMENTS

| | | |
|---|---|---|
| CN | 101404521 A | 4/2009 |
| CN | 101543996 A | 9/2009 |
| CN | 201754239 U | 3/2011 |
| CN | 102298345 A | 12/2011 |
| CN | 103257642 | 8/2013 |
| CN | 103777613 A | 5/2014 |
| EP | 0743578 A1 | 11/1996 |
| JP | 2006295610 A | 10/2006 |
| JP | 2012126546 A | 7/2012 |

OTHER PUBLICATIONS

International Search Report for PCT/CN2014/088181, dated Jan. 21, 2015, ISA/CN.
European Search Report for 14879888.7-1927/3098678, dated Jun. 26, 2017.
Design calculations for robust I2C Communications, Apr. 18, 2012, Chris Parris.
English introduction of CAN-Bus, Mar. 4, 2017.

* cited by examiner

METHOD AND SYSTEM FOR INTERACTING MASTER AND SLAVE INFORMATION IN REAL TIME

This application is the national phase of International Application No. PCT/CN2014/088181, titled "METHOD AND SYSTEM FOR INTERACTING MASTER AND SLAVE INFORMATION IN REAL TIME", filed on Oct. 9, 2014, which claims the priority to Chinese Patent Application No. 201410039040.7, titled "METHOD AND SYSTEM FOR INTERACTING MASTER AND SLAVE INFORMATION IN REAL TIME" and filed with the Chinese State Intellectual Property Office on Jan. 26, 2014, the entire disclosures of both applications are incorporated herein by reference.

FIELD

The present disclosure relates to the field of communication, and particularly to a method and a system for real-time master and slave information interaction.

BACKGROUND

In cash trading systems, sensor signals are important input signals for detecting position coordinates and width of bank notes and for triggering the transmission motion of electronic elements, and a number of sensors are distributed in bank note trading system. A control module (referred to as CPU) of the whole trading system often needs to know sensor signals of respective modules in a real-time manner, so as to issue real-time output control instructions based on position and state information on banknotes. In a case that the number of the sensors is large and physical distribution locations of the sensors are different, the whole trading system is divided into a main control CPU (upper) and multiple slave control CPU (lower), to control the modules. How to realize information interaction (real-time) between the master control CPU and the multiple slave control CPUs and to know signal inputs (sharing) of all sensors simultaneously will increase complexity of a system connection and CPU program control.

In the conventional technology, a method as follows is commonly applied: a master control micro control unit (referred to as MCU) and multiple slave control MCUs are used, where each slave control MCU is responsible for collecting sensor signals of modules thereof and controlling signals of electronic elements, and the information interaction between the master control MCU and the slave control MCUs is completely realized in a communicative manner. A communication process is described as follows.

1. The slave control MCU1 sends a command to the master control MCU, requesting to query a sensor signal of the slave control MCU2;
2. The master control MCU sends a command to read the sensor signal of the slave control MCU2;
3. The slave control MCU2 sends the sensor signal to the master control MCU; and
4. The master control MCU sends the sensor signal to the slave master MCU1.

However, in a case that the master control MCU is to send control instructions to multiple slave control MCUs, the master control MCU has to communicate with the slave control MCUs multiple times to realize the information interaction, which increases redundancy information interaction and reduces communication efficiency, and is not applicable to a rapid real-time response scenario.

SUMMARY

A method and a system for real-time master and slave information interaction are provided in the embodiments of the present disclosure, which can reduce the redundancy information interaction and raise the communication efficiency, and can be applicable to the rapid real-time response scenario.

A method for real-time master and slave information interaction is provided, which includes:
collecting, by N slave control MCUs, sensor signals of sensors respectively connected to the N slave control MCUs;
feeding, by the N slave control MCUs, the sensor signals back to a master control MCU via a signal transfer board; and
issuing, by the master control MCU, a control instruction to a corresponding slave control MCU based on a preset condition once a sensor signal meets the preset condition,
where the sensor signals and the control instruction are all transmitted between the master control MCU and the salve control MCUs via the signal transfer board in a form of SP signal.

Optionally, the method further includes:
collecting, by the master control MCU, a sensor signal of a sensor connected to the master control MCU.

Optionally, the issuing, by the master control MCU, the control instruction to the corresponding slave control MCU based on the preset condition once a sensor signal meets the preset condition includes:
analyzing, by the master control MCU, the sensor signal to obtain an analysis result; and
issuing, by the master control MCU, the control instruction to the corresponding slave control MCU based on the preset condition in a case that the analysis result meets the preset condition.

Optionally, the method further includes:
issuing, by the master control MCU, an execution instruction to a corresponding electronic element based on the preset condition once the sensor signal meets the preset condition, where the electronic element is connected to the master control MCU.

Optionally, after the issuing, by the master control MCU, the control instruction to the corresponding slave control MCU based on the preset condition, the method further includes:
issuing, by the slave control MCU, an execution instruction to an electronic element connected to the slave control MCU in response to the control instruction; and
performing, by the electronic element, a relevant operation in response to the execution instruction.

Optionally, the method further includes:
acquiring, by the slave control MCU, sensor signals of any one or more of remaining N−1 slave control MCUs from the master control MCU, where N is greater than or equal to 2.

Optionally, the method further includes:
transmitting, by the signal transfer board, the sensor signal collected by the slave control MCU to any one or more of remaining N−1 slave control MCUs in a preset transfer way directly, where N is greater than or equal to 2.

Optionally, the method further includes:
controlling, by the any one or more of the remaining N−1 slave control MCUs, a corresponding electronic element to operate based on the sensor signal after the any one or more of the remaining N−1 slave control MCUs receives the sensor signal.

A system for real-time master and slave information interaction is provided, which includes:

a master control MCU and N slave control MCUs; where the slave control MCU are connected to one or more sensors and/or are configured to control one or more electronic elements;

the master control MCU is line-connected to the N slave control MCUs via a signal transfer board;

the master control MCU is configured to issue a control instruction to a corresponding slave control MCU based on a preset condition once a sensor signal as acquired meets the present condition;

the slave control MCUs are configured to collect sensor signals of sensors respectively connected thereto, and feed the sensor signals to the master control MCU via the signal transfer board; and the sensor signals and the control instruction are all transmitted between the master control MCU and the salve control MCUs via the signal transfer board in a form of SP signal.

Optionally, the master control MCU is connected to one or more sensors and/or is configured to control one or more electronic elements; and the master control MCU is further configured to collect sensor signals of the one or more sensors connected thereto, and issue an execution instruction to a corresponding electronic element based on a preset condition once a sensor signal meets the preset condition.

The slave control MCU is further configured to issue an execution instruction to an electronic element connected thereto in response to the control instruction, and acquire sensor signals of any one or more of remaining N−1 slave control MCUs from the master control MCU, where N is greater than or equal to 2.

a particular one of the slave control MCUs is connected to any one or more of remaining N−1 slave control MCUs via a preset transfer way of the signal transfer board.

It can be seen from the above technical solutions that the embodiments of the present disclosure have the following advantages.

In the embodiments of the present disclosure, the N slave control MCUs collect the sensor signals of the sensors respectively connected thereto, and feed the sensor signals back to the master control MCU via the signal transfer board; once a sensor signal meets the preset condition, the master control MCU issues the control instruction to the corresponding slave control MCU based on the preset condition; the sensor signals and the control instruction are all transmitted between the master control MCU and the salve control MCUs via the signal transfer board in a form of SP signal. In the embodiments of the present disclosure, since non-communication interaction is realized between the master control MCU and the slave control MCU in the form of SP signal, real-time interaction is realized between the master control MCU and the slave control MCU, which reduces redundancy information interaction, and raises communication efficiency, and can be applied to a rapid real-time response scenario.

BRIEF DESCRIPTION OF THE DRAWINGS

The present disclosure can be further understood in conjunction with the drawings, and the drawings, as a part of the specification, along with the embodiments of the present disclosure are used to explain the present disclosure, and are not intended to limit the present disclosure. In the drawings.

DETAILED DESCRIPTION OF THE EMBODIMENTS

A method and a system for real-time master and slave information interaction are provided in the embodiments of the present disclosure, which can reduce the redundancy information interaction and raise the communication efficiency, and can be applied to a rapid real-time response scenario.

In order to make objects, features and advantages of the present disclosure clearer and easier to be understood, hereinafter, the technical solution in the embodiments of the present disclosure will be described clearly and completely in conjunction with the drawings in the embodiments of the present disclosure. Obviously, the described embodiments are only some of the embodiments of the present disclosure, but not all the embodiments. Any other embodiments obtained by those skilled in the art based on the embodiments of the present disclosure without creative work fall within the scope of protection of the present disclosure.

Figure 1:
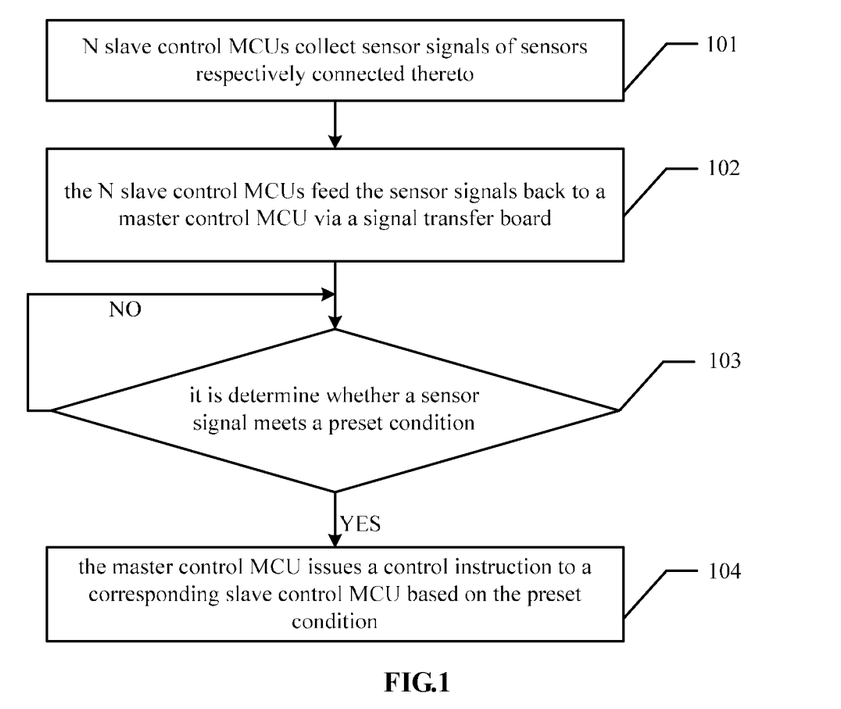
FIG. 1 is a flow diagram of a method for real-time master and slave information interaction according to an embodiment of the present disclosure.

With reference to FIG. 1, a method for real-time master and slave information interaction according to an embodiment of the present disclosure includes steps 101 to 104.

In 101, N slave control MCUs collect sensor signals of sensors respectively connected thereto.

The N slave control MCUs each control one or more sensors, and the N slave control MCUs collect the sensors signals of the sensors respectively connected thereto.

In 102, the N slave control MCUs feed the sensor signals back to a master control MCU via a signal transfer board.

The N slave control MCUs feed the sensor signals to the master control MCU via the signal transfer board after acquiring the sensor signals.

In 103, the master control MCU determines whether the sensor signals meet a preset condition, and executes 104 once a sensor signal meets the preset condition, or wait in a case that the sensor signals do not meet the preset condition.

The master control MCU determines whether the sensor signals meet the preset condition after acquiring the sensor signals, and executes 104 once a sensor signal meets the preset condition, or wait in a case that the sensor signals do not meet the preset condition.

In 104, the master control MCU issues a control instruction to a corresponding slave control MCU based on the preset condition.

In a case that the master control MCU determines that the sensor signal meets the preset condition, the master control MCU issues the control instruction to the corresponding slave control MCU based on the preset condition.

It should be noted that the sensor signals and the control instruction are all transmitted between the master control MCU and the slave control MCUs via the signal transfer board in a form of SP signal.

In the embodiment of the present disclosure, the N slave control MCUs collect the sensor signals of the sensors respectively connected thereto, and feed the sensor signals back to the master control MCU via the signal transfer board; once a sensor signal meets the preset condition, the master control MCU issues the control instruction to the corresponding slave control MCU based on the preset condition; the sensor signals and the control instruction are all transmitted between the master control MCU and the salve control MCUs via the signal transfer board in a form of SP signal. In the embodiment of the present disclosure, since non-communication interaction is realized between the master control MCU and the slave control MCUs in a form of SP signal, real-time interaction is realized between the master control MCU and the slave control MCUs, which reduces the redundancy information interaction, and raises the communication efficiency, and can be applied to a rapid real-time response scenario.

Figure 2:
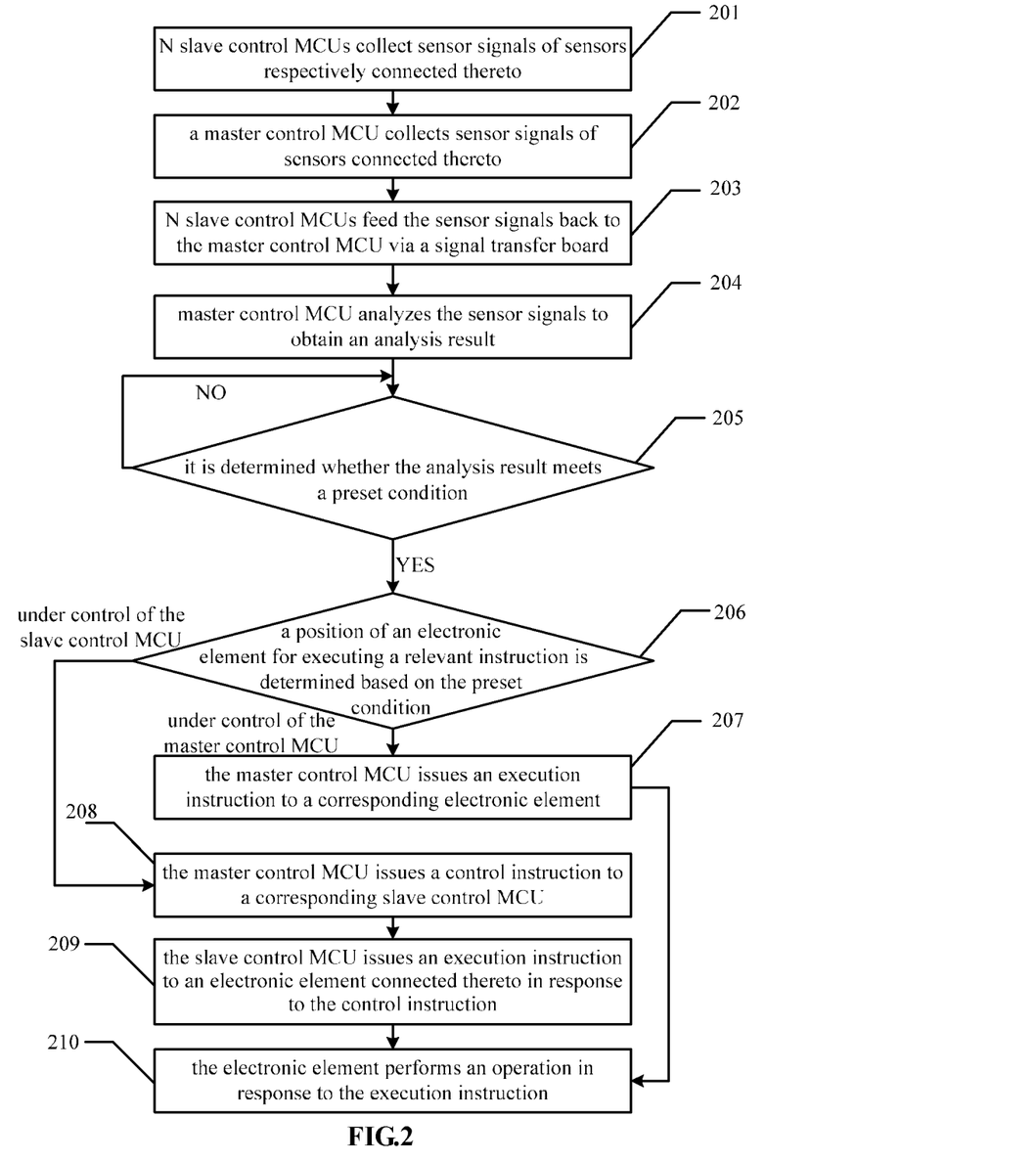
FIG. 2 is a flow diagram of a method for real-time master and slave information interaction according to another embodiment of the present disclosure.

To facilitate the understanding, the method for real-time master and slave information interaction according to the embodiment of the present disclosure is described in detail below, with reference to FIG. 2, the method for real-time master and slave information interaction according to another embodiment includes steps 201 to 210.

In 201, N slave control MCUs collect sensor signals of sensors respectively connected thereto.

The N slave control MCUs each control one or more sensors, and the N slave control MCUs collect the sensors signals of the sensors respectively connected thereto.

In 202, a master control MCU collects sensor signals of sensors connected thereto.

The master control MCU may also control one or more sensors, and collect sensor signals of the sensors connected thereto. It can be understood that the sensor signals of the sensors are acquired by the master control MCU directly.

In 203, the N slave control MCUs feed the sensor signals back to the master control MCU via a signal transfer board.

After acquiring the sensor signals, the N slave control MCUs feed the sensor signals back to the master control MCU via the signal transfer board. It can be understood that the signal transfer board may not have any CPU or MCU, and is only responsible for transferring signals, the sensor signals may be transmitted between the master control MCU and the slave control MCUs via the signal transfer board in a form of SP signal. The SP signal may be a level signal having feature of rapid and simple transmission.

In 204, the master control MCU analyzes the sensor signals to obtain an analysis result.

After acquiring the sensor signals, the master control MCU analyzes the sensor signals to obtain the analysis result. It can be understood that the master control MCU can determine a state of each of the sensors based on the analysis result, to perform corresponding processing for a corresponding state, which is not limited here.

In 205, the master control MCU determines whether the analysis result meets a preset condition, and executes 206 in a case that the analysis result meets the preset condition, or wait in a case that the analysis result does not meet the preset condition.

After acquiring the analysis result, the master control MCU determines whether the analysis result meets the preset condition, and executes 206 in a case that the analysis result meets the preset condition, or wait in a case that the analysis result does not meet the preset condition. It can be understood that the preset condition may be set according to actual needs.

In 206, the master control MCU determines a position of an electronic element for executing a relevant instruction based on the preset condition, and executes 207 in a case that the electronic element is under control of the master control MCU, or executes 208 in a case that the electronic element is under control of a slave control MCU.

In a case that the analysis result meets the preset condition, the master control MCU determines which one or more electronic elements to execute the operation, determines position(s) of the electronic element or electronic elements for executing the operation, and send the relevant instruction to the electronic element or electronic elements. 207 is executed in a case that the electronic element(s) is (are) under the control of the master control MCU, or 208 is executed in a case that the electronic element(s) is (are) under the control of a slave control MCU.

In 207, the master control MCU issues an execution instruction to a corresponding electronic element.

In a case that the corresponding electronic element is under control of the master control MCU, the master control MCU issues the execution instruction to the corresponding electronic element.

In 208, the master control MCU issues a control instruction to a corresponding slave control MCU.

In a case that the corresponding electronic element is under control of a slave control MCU, the master control MCU issues the control instruction to the corresponding slave control MCU. It can be understood that the control instruction can be used to instruct the slave control MCU to issue an execution instruction to the corresponding electronic element under control of the slave control MCU.

In 209, the slave control MCU issues an execution instruction to an electronic element connected thereto in response to the control instruction.

After receiving the control instruction, the slave control MCU issues the execution instruction to the electronic element connected thereto in response to the control instruction. It can be understood that the slave control MCU can issue the execution instruction to each of electronic elements under control of the slave control MCU, or issue the execution instruction to a relevant electronic element in response to the control instruction without issuing the execution instruction to irrelevant electronic elements.

In 210, the electronic element performs a relevant operation in response to the execution instruction.

The electronic element, regardless of under control of the master control MCU or under control of the N slave control MCUs, performs the operation in response to the execution instruction after receiving the execution instruction.

It should be noted that, the sensor signals and the control instruction described above are all transmitted between the master control MCU and the slave control MCUs via the signal transfer board in a form of SP signal, to maintain real-time interaction between the master control MCU and the slave control MCUs.

It should be noted that the slave control MCU can acquire sensor signals of any one or more of remaining N−1 slave control MCUs from the master control MCU, the signal transfer board may transmit the sensor signal(s) collected by the slave control MCU to any one or more of remaining N−1 slave control MCUs directly in a preset transfer manner, where N is greater than or equal to 2. Therefore, after receiving the sensor signal(s), the any one or more of the remaining N−1 slave control MCUs may control a corresponding electronic element to operate based on the sensor signal(s). Signal sharing between the slave control MCUs can be realized by the process described above, and rapider response between some special sensors and/or the electronic elements can be realized without the participation of the master control MCU.

It can be known that the master control MCU monitors the sensor in a real-time manner via the real-time collection based on the a timer of the master control MCU, and the sensor signals of the sensors connected to the slave control MCU are collected by the slave control MCU. A delay in transmitting the SP signals and the sensor signals and a delay in positioning coordinates of a banknote are only limited by a speed of an instruction between the master control MCU and the slave control MCU and time consumed in configuring the timer scan signal. For a control scenario with a high real-time demand for triggering by the sensor signals, the method can reduce effectively the number of communication interactions, avoid a communication delay in instant controlling, and have a high efficiency.

In the embodiment of the present disclosure, the N slave control MCUs collect the sensor signals of the sensor respectively connected thereto, and feed the sensor signals back to the master control MCU via the signal transfer board; the master control MCU analyzes the sensor signals to obtain the analysis result; in a case that the analysis result meets the preset condition, the master control MCU issues the control instruction to the corresponding slave control MCU based on the preset condition; the sensor signals and the control instruction are all transmitted between the master control MCU and the salve control MCUs via the signal transfer board in a form of SP signal. In the embodiment of the present disclosure, since non-communication interaction is realized between the master control MCU and the slave control MCUs in the form of SP signal, real-time interaction is realized between the master control MCU and the slave control MCUs, which reduces redundancy information interaction, and raises communication efficiency, and can be applied to a rapid real-time response scenario.

Figure 3:
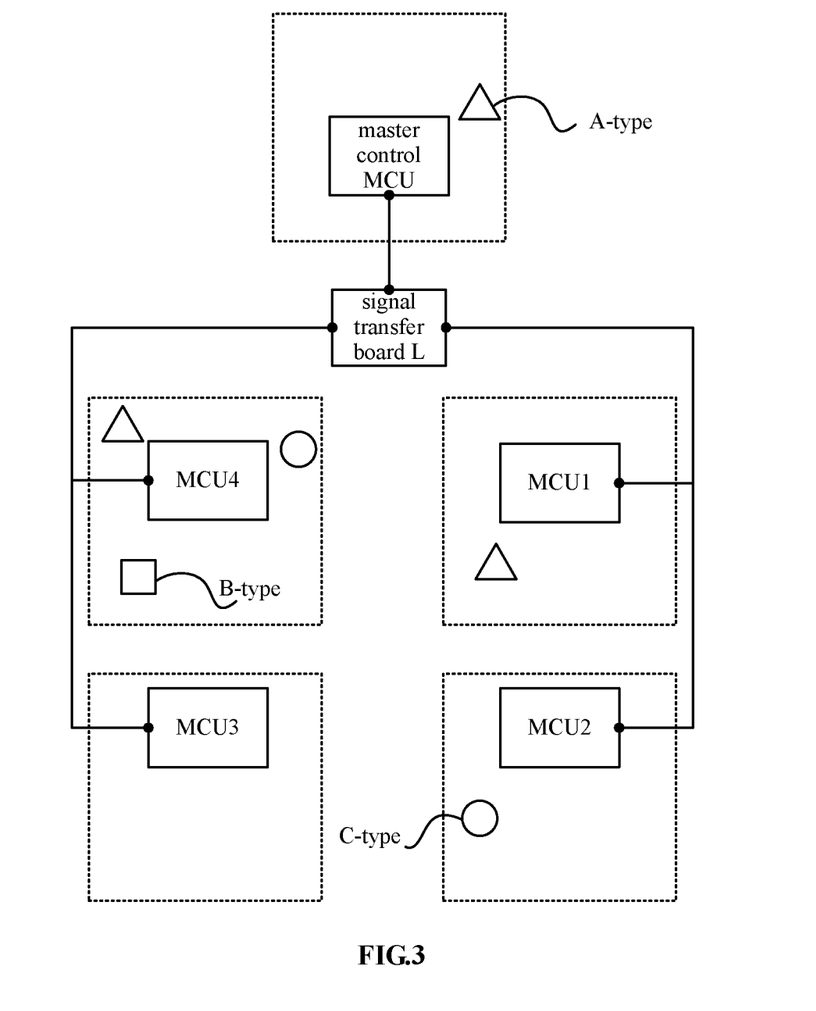
FIG. 3 is a schematic diagram of a method for real-time master and slave information interaction according to an embodiment of the present disclosure.

To facilitate the understanding, on the basis of the embodiment described in FIG. 2, the method for real-time master and slave information interaction according to the embodiment of the present disclosure is described below with an actual application scenario, referring to FIG. 3:

Types of the Sensors:

The A-type sensor is a special sensor which is to be monitored by the master control MCU and multiple slave control MCUs in real-time, a sensor signal of the A-type sensor, after being transferred and filtered, is outputted from the slave control MCU to other slave control MCUs and the master control MCU.

The B-type sensor is a sensor of which the signal is to be passed between the slave control MCUs. A sensor signal of the B-type sensor is transferred and filtered, and then is outputted to other slave control MCUs. An input and output way of the B-type sensor is single-point input and multi-point output.

The C-type sensor is a sensor monitored by the master control MCU and the slave control MCU, separately, and does not need to be detected by other MCUs in a real-time manner.

In the embodiment, a specific interaction among a master control MCU and four slave control MCUs is described as below.

a: The master control MCU detects a C-type sensor in a master control region and A-type sensors in region of the slave control MCUs, the four slave control MCUs monitor and scan the A-type sensors, monitor and scan a B-type sensor and each monitor and scan a C-type sensor in their own regions in a real-time manner.

b: Interfaces of the master control MCU include a communication interaction interface, an interface for transmitting the A-type sensor signal in a real-time manner, an interface for master and slave SP signal interaction. The communication interaction interface is used to transmit a part of signals not to be interacted in a real-time manner between the master control MCU and the slave control MCUs.

c: The salve control MCUs, once being powered up, are responsible for supplying power to and initiating the A-type sensors, the B-type sensors and the C-type sensors in their own regions, and perform autonomous testing for light source intensity and function self-checking on some sensors without the intervening of the master control MCU.

d: A signal transfer board L does not have a CPU, and is only responsible for filtering, reforming and logically outputting the inputted signal.

e: The signal transfer board L performs transfer processing on all sensor signals of the A-type sensors and the B-type sensors; the sensor signal of the A-type sensor is filtered and reformed by the signal transfer board L, and then is transmitted to all other slave control MCUs and the master control MCU; the sensor signal of the B-type sensor is filtered and reformed by the signal transfer board L, and then is transmitted to all other slave control MCUs. After receiving the sensor signals, all MCUs each will determine whether the sensor signals meet a preset condition preset on the MCU, and step g is executed once a sensor signal meets the preset condition, or no operation is performed in a case that the sensor signals do not meet the preset condition.

f: The C-type sensor is monitored only by the slave control MCU4, step g is executed in a case that a sensor signal of the C-type sensor meet a preset condition of the slave control MCU4, or no operation is performed in a case that the sensor signal of the C-type sensor do not meet the preset condition of the slave control MCU4.

g: the MCU which detects a sensor signal meeting the preset condition sends an execution instruction to a corresponding electronic element based on the preset condition; in a case that the electronic element is located in the region of the MCU, the MCU sends the execution instruction to the electronic element; or in a case that the electronic element is not located in the region of the MCU, the MCU sends a control instruction to a MCU corresponding to the region where the electronic element is located, and the corresponding MCU sends an execution instruction to the electronic element. For example, assuming that MCU2 detects that sensor signal of the A-type sensor of the MCU4 meets the preset condition of MCU2, and it is set according to the that preset condition that an electronic element of the MCU1 is to operate, MCU2 sends a control instruction to the MCU1, and the MCU1 sends an execution instruction to the electronic element after receiving the control instruction, to enable the electronic element to execute the operation. The control instruction and the sensor signals mentioned here are transmitted in a form of SP signal.

h: No communication interaction between the slave control MCUs is required; in some cases that the master control MCU and the slave control MCU have a low demand for real-time and response time and have relatively large amount of information interaction, a common communication such as CAN standard communication can be used to realize bus communication between the master control MCU and multiple slave control MCUs, and reduce communication cable connection. The single-point input and multi-point output is adopted for sensor signals of the A-type sensor and the B-type sensor having the real-time feature, and the sensor signals cooperates with the SP signal of the master control MCU to realize real-time control for electronic elements of the slave control MCU having a high demand for real-time and a complex action time sequence.

Figure 4:
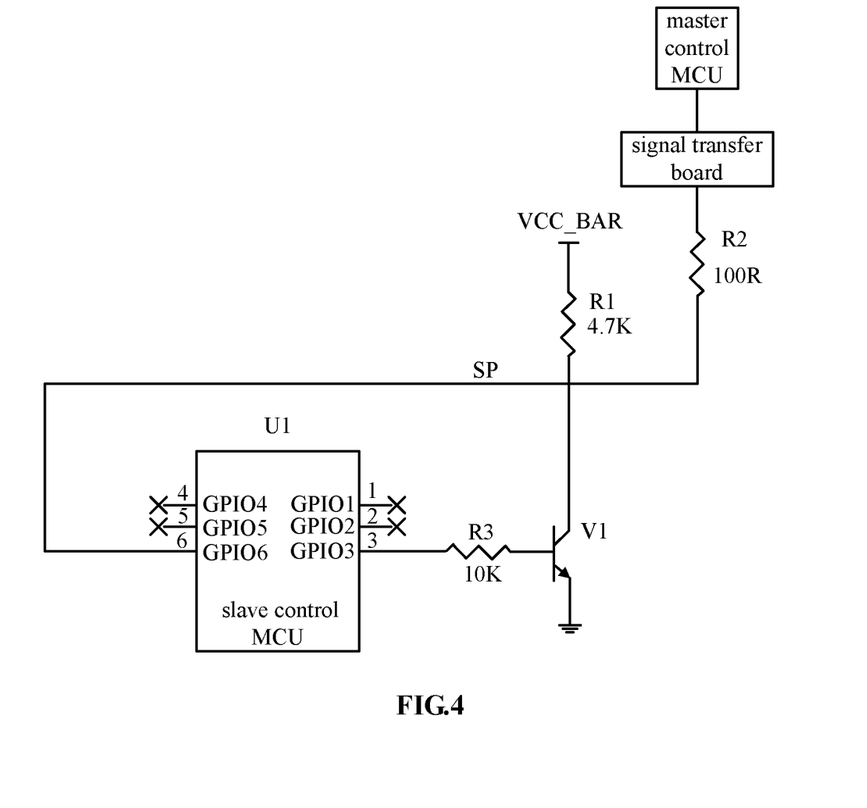
FIG. 4 is a schematic structural diagram about SP signal in a method for real-time master and slave information interaction according to an embodiment of the present disclosure.

It can be understood from the above description that the SP signal is important for the real-time interaction between the master control MCU and the slave control MCU. To facilitate further understanding to the SP signal, description is set forth below regarding the generation and usage of the SP signal. With reference to FIG. 4, the SP signal according to an embodiment of the present disclosure is described below.

The SP signal is a bidirectional signal, and is outputted from a collector of an NPN transistor in a pull-up way. Here the SP signal is transmitted in a long line and an inverter or a buffer IC device is normally used to perform shaping and filtering on the SP signal, so as to protect the slave control MCU. The SP signal occupies two IO ports of the slave control MCU, where GPIO3 is a control port of the SP signal through which the output signal is pulled down to a low level. In a case that the slave control MCU executes some special instructions of the master control MCU abnormally, the slave control MCU will pull down the SP signal, to feed back a rapid response state in which the slave control MCU executes an instruction. GPIO6 of the master control MCU is an input port for the slave control MCU, the slave control MCU scans the SP signal in a real-time manner, and executes a subsequent of actions according to a valid appointment for the SP signal.

Figure 5:
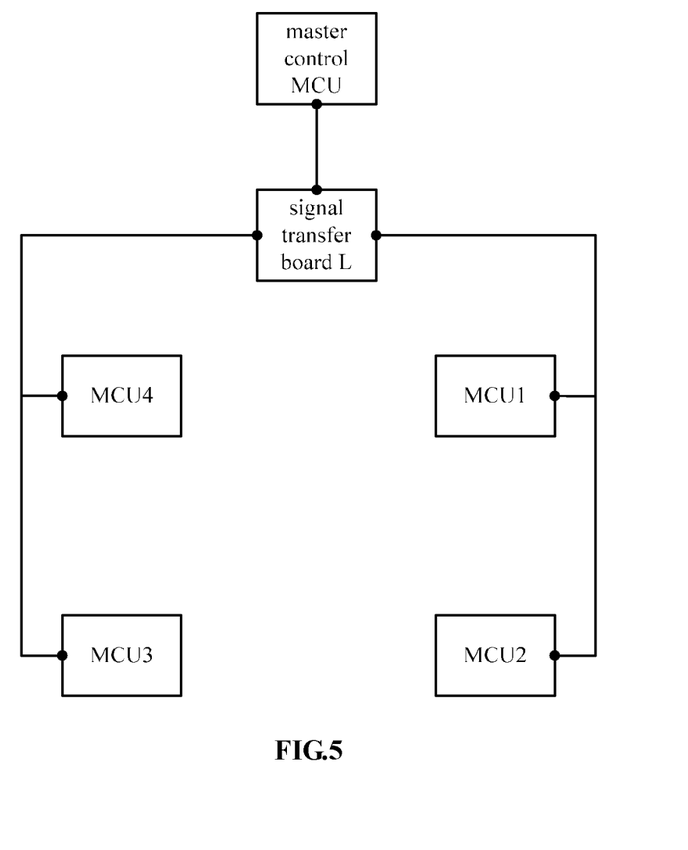
FIG. 5 is a schematic diagram of allocating an ID for a slave control MCU in a method for real-time master and slave information interaction according to an embodiment of the present disclosure.

The generation and usage of the SP signal are described in detail above, and in the following the scheme for the SP signal to allocate address (referred to as ID) for the slave control MCU is described in detail below, with reference to FIG. 5.

A process of allocating the ID in the embodiment is described as follows: after powering up, the master control MCU initiates broadcast communication by using an SP signal and a CAN bus communication protocol; each of independent slave control MCUs enters into an interrupt receiving state after receiving the broadcast communication, and detects the SP signal sent by the master control MCU. In a case that the SP signal has a valid level (normally, it is set that a high level is the valid level), the slave control MCU receives data sent from the CAN bus, where the data includes a communication identifier of the slave control MCU; the slave control MCU can erase an address of the broadcast communication. In a case that there are four slave control MCUs, the master control MCU initiates four broadcast communications, and identifies the four slave control MCUs as MCU1, MCU2, MCU3 and MCU4, respectively, and address IDs of the slave control MCUs are distinguished by physical signals of the SP signals.

In a case that the slave control MCU is abnormal and an internal state of the slave control MCU is not ready for communication interaction, the slave control MCU can change a state of the SP signal actively, in this case, the master control MCU can detect that the state of the slave control MCU is abnormal and stop sending the broadcast communication, therefore, the process of ID allocation has effective and real-time information interaction.

It can be known from the embodiment that, when the IDs of the slave control MCUs are allocated by the SP signal, the slave control MCUs are not identified based on hardware addresses, and broadcast communication is initiated to each of the slave control MCUs directly via the SP signal to allocate the IDs. Every time the system is initiated or the MCU is powered up and connected, the IDs are allocated, the master control MCU can distinguish the slave control MCUs after allocating the IDs, and the slave control MCUs are marked as MCU1, MCU2, MCU3 and MCU4, and the hardware addresses are identified via software. Also, the CAN bus communication between the master control MCU and the slave control MCUs can be realized after the IDs are allocated, and a normal communication link can be maintained.

Figure 6:
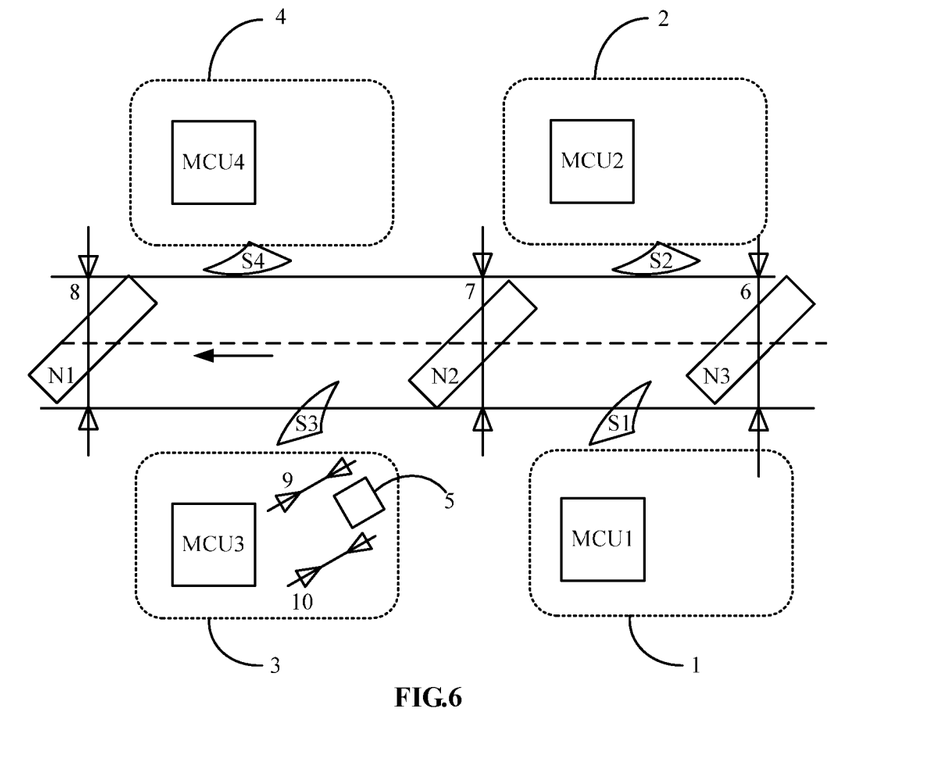
FIG. 6 is a schematic structural diagram of a method for real-time master and slave information interaction according to an embodiment of the present disclosure.

To facilitate the understanding, the method for real-time master and slave information interaction in the embodiment of the present disclosure is illustrated in detail below by a specific application scenario. Referring to FIG. 6, the method for real-time master and slave information interaction according to an embodiment of the present disclosure is described below.

A medium is controlled in a real-time manner when entering a storage region: it is implemented that a master control MCU triggers and controls an electronic element of a slave control MCU.

Reference numerals in the drawing: a storage region 1, a storage region 2, a storage region 3 and a storage region 4 black arrow represents a motion direction of the medium;

slave control MCUs: MCU1, MCU2, MCU3 and MCU4, and the master control MCU is not shown in FIG. 6.

SP signals between the MCU1, MCU2, MCU3, MCU4 and the master control MCU are SP1, SP2, SP3 and SP4, respectively.

a power stepping motor 5 controlled by the slave control MCU3;

bidirectional reversing block (rolling electromagnet) S2 in the storage region 2;

bidirectional reversing block (rolling electromagnet) S3 in the storage region 3;

A-type sensor 6 (a mechanical installation position of the A-type sensor 6 is in a region of a signal transfer board L, and the A-type sensor 6 is shared among the master control MCU, MCU1 and MCU2 in a real-time manner);

A-type sensor 7 (a mechanical installation position of the A-type sensor 7 is in a control region of MCU2, i.e. the storage region 2, and the A-type sensor 7 is shared among the master control MCU, MCU1, MCU2 and MCU3 in a real-time manner);

A-type sensor 9 (a mechanical installation position of the A-type sensor 9 is in a control region of MCU3, i.e. the storage region 3, and the A-type sensor 9 is shared among the master control MCU and MCU3 in a real-time manner);

B-type sensor 8 (a mechanical installation position of the B-type sensor 8 is in a control region of MCU3, i.e. the storage region 3, and the B-type sensor 8 is shared by MCU3 and MCU4 in a real-time manner);

C-type sensor 10 (a mechanical installation position of the C-type sensor 10 is in a control region of MCU3, i.e. the storage region 3, and the C-type sensor 10 is scanned by the MCU3 in a real-time manner);

N1, N2 and N3 are mediums to be scanned.

Only a case that mediums enter into the storage region 3 is described.

Assuming that multiple mediums are transmitted to position 1, position 2 and position 3, distributed as positions of N1, N2 and N3 shown in FIG. 6, respectively. The master control MCU expects the slice medium N3 to enter into the storage region 3 via the bidirectional reversing block S3 and the medium N2 to enter into the storage region 2 via the bidirectional reversing block S2. A case that the N3 is controlled to enter into the storage region 3 is taken as an example. A-type sensor 7 is close to the storage region 3, assumed that a distance s between the A-type sensor 7 and the S3 is 50 mm due to a mechanical design and distance limit, and in a case that a speed v of the medium N3 in a channel is 1.2 m/s, time required is $t=s/v=41.67$ ms. In order to make sure that the medium N3 can enter into the storage region 3 successfully and reduce a speed difference of the N3 at joint between two channels, a speed of the power stepping motor 5 needs to be close to 1.2 m/s (2000 PPS) before the N3 arrives at the S3. A process of starting the power stepping motor 5 is a process from a low speed to a high speed because of a characteristic of stepping control of the power stepping motor 5, a time period from standstill to reaching the speed of 2000 PPS is much longer than 41 ms, a triggering signal of the power stepping motor should not come from the A-type sensor 7, and the master control MCU determines which storage region the medium N3 enters into. Control steps are as follows.

In step a, at first the master control MCU detects the C-type sensors and the A-type sensors in all regions in a real-time manner, and then determines that the medium N3 should enter into the storage region 3.

In step b, the medium N3 (such as a width or a slope of the medium) meets a condition before triggering the A-type sensor, a triggering signal of the medium N3 is detected by the A-type sensor 6, and the master control MCU sends a SP3 signal which is valid.

In step c, the MCU3 starts the power stepping motor 5 (at a speed which meets a requirement for a motor starting speed) immediately after detecting that the SP3 signal is valid.

In step d, when the A-type sensor 7 is triggered by the medium N3, it is determined whether the SP3 signal is still valid and whether there is a medium at the B-type sensor 8 (which is for meeting safe space for medium transmission), and the MCU3 starts the bidirectional inversing block S3 if the SP3 is valid and there is no medium at the B-type sensor 8.

In step e, after the medium N3 enters into the S3, the MCU3 detects in a real-time manner whether the A-type and C-type sensor signals in the storage region 1, the storage region 2, the storage region 3 and the storage region 4 are abnormal, and the MCU3 shuts down the power stepping motor 5 actively if abnormal.

In step f, in a case that the medium N3 is triggered to leave the A-type sensor 9, the master control MCU shuts down the SP3 signal, and the MCU3 shuts down the power stepping motor 5 and the bidirectional inversing block S3 actively when detecting that the SP3 signal is invalid.

In step g, in a case that the MCU detects that the SP3 signal is still valid when the C-type sensor 10 is trigger by the medium N3, the MCU3 shuts down the power stepping motor 5 and the bidirectional inversing block S3 actively, and report an error actively, to ensure safe controllability and stability.

In the embodiment, the SP signal is controlled by the A-type sensor and the master control MCU in a real-time manner, therefore, a problem of long time required for starting the electronic element can be solved effectively, and an effect of triggering in advance or in real-time can be realized, control stability is ensured and the operability is good.

It can be known from the embodiment that, a way of real-time starting and timely shutting down the motor is specially suit for the case that the medium is stored in a tape. In such a control manner, the electronic element of the slave control MCU is controlled instantly, which can save volume of the tape in the storage region, increase storage capacity and have good control feasibility. A way of starting the electronic element by the slave control is controlled by the SP signal sent by the master control MCU, and the case that the slave control MCU actively shuts down the electronic element not only depends on the SP signal of the master control MCU but also is under control of active determination of the slave control MCU. The master control MCU can trigger a switch of the electronic element of the slave control MCU in real-time by using the A-type sensor, the B-type sensor, the C-type sensor and the SP signal without triggering in a communication way, thereby having high stability, strong anti-interference performance, not only ensuring triggering in advance and rapid starting, but also ensuring safe stability since the slave control MCU can take active control of the electronic element in a case that the slave control MCU is abnormal.

Figure 7:
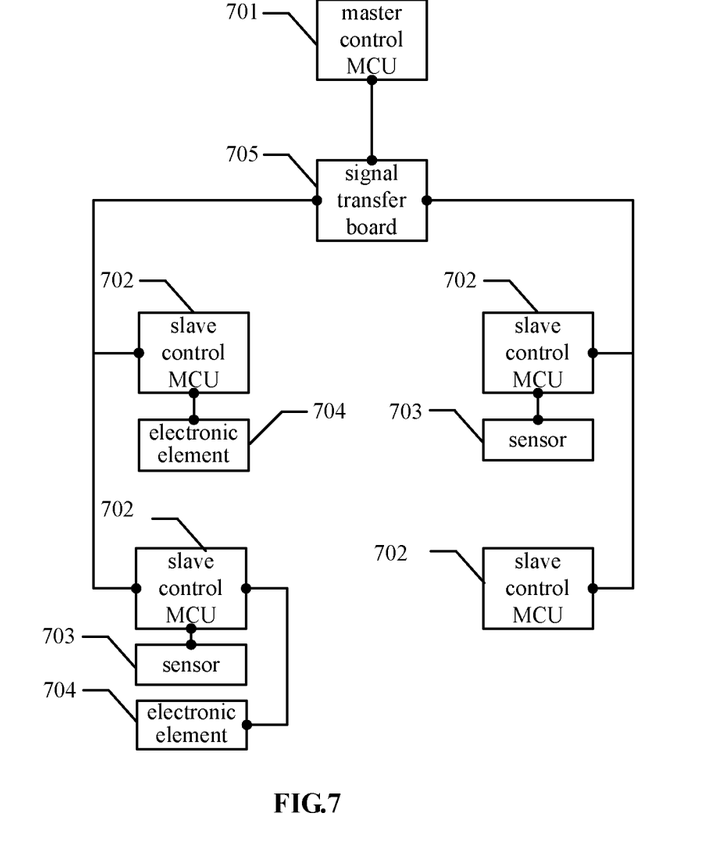
FIG. 7 is a schematic diagram of a system for real-time master and slave information interaction according to an embodiment of the present disclosure.

The method for real-time master and slave information interaction is described in detail above, and a system for real-time master and slave information interaction is described in detail below. With reference to FIG. 7, the system for real-time master and slave information interaction according to an embodiment of the present disclosure includes:

a master control MCU 701 and N slave control MCU 702; where the slave control MCUs 702 are connected to several sensors 703 and/or are configured to control several electronic elements 704;

the master control MCU 701 is line-connected to the N slave control MCU 702 via a signal transfer board 705;

the master control MCU 701 is configured to issue a control instruction to a corresponding slave control MCU 702 based on a preset condition in a case that a sensor signal acquired by the master control MCU 701 meets the preset condition;

the slave control MCUs 702 are configured to collect sensor signals of sensors 703 respectively connected thereto, and feed the sensor signals back to the master control MCU 701 via the signal transfer board 705;

the sensor signal and the control instruction are all transmitted between the master control MCU 701 and the slave control MCUs 702 via the signal transfer board 705 in a form of SP signal.

It should be noted that the master control MCU 701 may be connected to the several sensors 703 and/or may be configured to control the several electronic elements 704.

The master control MCU 701 may be further configured to collect a sensor signal of a sensor 703 connected thereto, and the master control MCU 701 is configured to issue an execution instruction to a corresponding electronic element 704 based on a preset condition in a case that the sensor signal meets the preset condition.

The slave control MCU 702 may be further configured to issue an execution instruction to an electronic element 704 connected thereto in response to the control instruction, and acquire from the master control MCU 701 sensor signals of any one or more of remaining N−1 slave control MCUs 702, where N is greater than or equal to 2.

A certain one of the slave control MCUs 702 may be connected to the any one or more of remaining N−1 slave control MCUs 702 via a preset transfer way of the signal transfer board 705.

It can be clearly understood by those skilled in the art that, for convenience and briefness of description, processes of the described system, apparatus and units may be referred to corresponding processes according to the foregoing method embodiments of the disclosure, and are not further described here.

It should be understood that, according to the embodiments of the disclosure, the disclosed system, apparatus and methods may be implemented in other ways. For example, the described apparatus embodiment is merely exemplary. The division of the units is merely based on logical functions, and the units may be divided with other approaches in practice. For example, multiple units or modules may be combined, or may be integrated into another system, or some features may be omitted or not be implemented. In addition, the displayed or discussed couplings, direct couplings or communication connections between individual components may be implemented via indirect couplings or communication connections between some interfaces, devices or units, which may be electrical, mechanical or in other forms.

The units described as separate components may be or not be separated physically. The components shown as units may either be or not be physical units, i.e., the units may be located at one place or may be distributed onto multiple network units. All of or part of the units may be selected based on actual needs to implement the solutions according to the embodiments of the disclosure.

In addition, individual function units according to the embodiments of the disclosure may be integrated in one processing unit, or the units may exist separately, or two or more units may be integrated in one unit. The integrated unit may be implemented in hardware or software function unit.

If the integrated units are implemented in the form of software function unit and the software function unit is sold or used as separate products, the software function unit may also be stored in a computer readable storage medium. Based on such understanding, the technical solutions of the disclosure, part of the disclosure that contributes to existing technologies or part of the technical solutions may be embodied in the form of a computer software product. The computer software product is stored in a storage medium and includes several instructions for instructing a computer device (which may be personal computer, server, network device or the like) to implement all of or part of the steps of the methods according to the embodiments of the disclosure. The foregoing storage medium includes various media that can store program codes, for example, USB disk, mobile hard disk drive, Read-Only Memory (ROM), Random Access Memory (RAM), magnetic disk, optical disk and the like.

To sum up, it should be noted that, the above embodiments are only used describe the technical schemes of the present disclosure, and not intended to limit the present disclosure. Although the disclosure is illustrated with reference to the embodiments thereof, those skilled in the art should appreciate that many modifications are possible for solutions of the exemplary embodiments, or substitutions may be made to part or all of the technical features in the embodiments; those modifications and substitutions would not render the essential of the solutions deviate from the scope of the disclosure.

The invention claimed is:

1. A method for real-time master and slave information interaction, comprising:
    collecting, by N slave control Micro Controller Units (MCUs), sensor signals of sensors respectively connected to the N slave control MCUs;
    feeding, by the N slave control MCUs, the sensor signals back to a master control MCU via a signal transfer board; and
    issuing, by the master control MCU, a control instruction to a corresponding slave control MCU based on a preset condition once a sensor signal meets the preset condition,
    wherein the sensor signals and the control instruction are all transmitted between the master control MCU and the slave control MCUs via the signal transfer board in a form of a first signal;
    wherein after powering up, the master control MCU initiates broadcast communication by using the first signal and a Controller Area Network (CAN) bus communication protocol; each of independent slave control MCUs enters into an interrupt receiving state after receiving the broadcast communication, and detects the first signal sent by the master control MCU; in a case that the first signal has a valid level, the slave control MCU receives data sent from the CAN bus, where the data comprises a communication identifier of the slave control MCU; the slave control MCU erases an address of the broadcast communication.

2. The method according to claim 1, further comprising:
    collecting, by the master control MCU, a sensor signal of a sensor connected to the master control MCU.

3. The method according to claim 1, wherein the issuing, by the master control MCU, the control instruction to the corresponding slave control MCU based on the preset condition once a sensor signal meets the preset condition comprises:
    analyzing, by the master control MCU, the sensor signal to obtain an analysis result; and
    issuing, by the master control MCU, the control instruction to the corresponding slave control MCU based on the preset condition in a case that the analysis result meets the preset condition.

4. The method according to claim 1, further comprising:
    issuing, by the master control MCU, an execution instruction to a corresponding electronic element based on the preset condition once the sensor signal meets the preset condition, wherein the electronic element is connected to the master control MCU.

5. The method according to claim 1, wherein after the issuing, by the master control MCU, the control instruction to the corresponding slave control MCU based on the preset condition, the method further comprises:
    issuing, by the slave control MCU, an execution instruction to an electronic element connected to the slave control MCU in response to the control instruction; and
    performing, by the electronic element, a relevant operation in response to the execution instruction.

6. The method according to claim 1, further comprising:
acquiring from the master control MCU, by the slave control MCU, sensor signals of any one or more of remaining N−1 slave control MCUs, where N is greater than or equal to 2.

7. The method according to claim 1, further comprising:
transmitting, by the signal transfer board, the sensor signal collected by the slave control MCU to any one or more of the remaining N−1 slave control MCUs in a preset transfer way directly, where N is greater than or equal to 2.

8. The method according to claim 7, further comprising:
controlling, by the any one or more of the remaining N−1 slave control MCUs, a corresponding electronic element to operate based on the sensor signal after the any one or more of the remaining N−1 slave control MCUs receives the sensor signal.

9. A system for real-time master and slave information interaction, comprising:
a master control Micro Controller Unit (MCU) and N slave control MCUs, wherein
the slave control MCUs are connected to one or more sensors and/or are configured to control one or more electronic elements;
the master control MCU is line-connected to the N slave control MCUs via a signal transfer board;
the master control MCU is configured to issue a control instruction to a corresponding slave control MCU based on a preset condition once a sensor signal as acquired meets the present condition;
the slave control MCUs are configured to collect sensor signals of sensors respectively connected to the slave control MCUs, and feed the sensor signals to the master control MCU via the signal transfer board; and
the sensor signals and the control instruction are all transmitted between the master control MCU and the slave control MCUs via the signal transfer board in a form of a first signal;
wherein after powering up, the master control MCU initiates broadcast communication by using the first signal and a Controller Area Network (CAN) bus communication protocol; each of independent slave control MCUs enters into an interrupt receiving state after receiving the broadcast communication, and detects the first signal sent by the master control MCU; in a case that the first signal has a valid level, the slave control MCU receives data sent from the CAN bus, where the data comprises a communication identifier of the slave control MCU; the slave control MCU erases an address of the broadcast communication.

10. The system for real-time master and slave information interaction according to claim 9, wherein
the master control MCU is connected to one or more sensors and/or is configured to control one or more electronic elements;
the master control MCU is further configured to collect sensor signals of the one or more sensors connected to the master control MCU, and issue an execution instruction to a corresponding electronic element based on the preset condition once a sensor signal meets the preset condition;
the slave control MCU is further configured to issue an execution instruction to an electronic element connected to the slave control MCU in response to the control instruction, and acquire from the master control MCU sensor signals of any one or more of remaining N−1 slave control MCUs, where N is greater than or equal to 2; and
a particular one of slave control MCUs is connected to the any one or more of the remaining N−1 slave control MCUs via a preset transfer way of the signal transfer board.

11. The method according to claim 3, wherein after the issuing, by the master control MCU, the control instruction to the corresponding slave control MCU based on the preset condition, the method further comprises:
issuing, by the slave control MCU, an execution instruction to an electronic element connected to the slave control MCU in response to the control instruction; and
performing, by the electronic element, a relevant operation in response to the execution instruction.

12. The method according to claim 1, wherein the first signal is a bidirectional signal.

13. The method according to claim 12, wherein the first signal is outputted from a collector of an NPN transistor in a pull-up way.

14. The method according to claim 12, wherein in a case that the slave control MCU executes an instruction of the master control MCU abnormally, the slave control MCU pulls down the first signal, to feed back a rapid response state in which the slave control MCU executes the instruction.

15. The method according to claim 9, wherein the first signal is a bidirectional signal.

16. The method according to claim 15, wherein the first signal is outputted from a collector of an NPN transistor in a pull-up way.

17. The method according to claim 15, wherein in a case that the slave control MCU executes an instruction of the master control MCU abnormally, the slave control MCU pulls down the first signal, to feed back a rapid response state in which the slave control MCU executes the instruction.

* * * * *